(12) United States Patent
Yanaka et al.

(10) Patent No.: US 11,701,874 B2
(45) Date of Patent: Jul. 18, 2023

(54) LAYERED SHEET, ELECTRONIC COMPONENT PACKAGING CONTAINER, AND ELECTRONIC COMPONENT PACKAGING

(71) Applicant: DENKA COMPANY LIMITED, Tokyo (JP)

(72) Inventors: Ryosuke Yanaka, Tokyo (JP); Junpei Fujiwara, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 5 days.

(21) Appl. No.: 17/604,341

(22) PCT Filed: Apr. 16, 2020

(86) PCT No.: PCT/JP2020/016651
§ 371 (c)(1),
(2) Date: Oct. 15, 2021

(87) PCT Pub. No.: WO2020/218133
PCT Pub. Date: Oct. 29, 2020

(65) Prior Publication Data
US 2022/0194067 A1    Jun. 23, 2022

(30) Foreign Application Priority Data

Apr. 26, 2019   (JP) ................................ 2019-084912

(51) Int. Cl.
*B32B 27/30* (2006.01)
(52) U.S. Cl.
CPC .................... *B32B 27/30* (2013.01)
(58) Field of Classification Search
CPC ................................................ B32B 27/30
See application file for complete search history.

(56) References Cited

U.S. PATENT DOCUMENTS

| 6,552,131 B1 | 4/2003 | Higuchi et al. |
| 2005/0124739 A1 | 6/2005 | Oda et al. |
| (Continued) | | |

FOREIGN PATENT DOCUMENTS

| JP | 2001-278985 A | 10/2001 |
| JP | 2002-332392 A | 11/2002 |
| (Continued) | | |

OTHER PUBLICATIONS

English machine translation of JP2011042072A (Mar. 3, 2011). (Year: 2011).*

(Continued)

*Primary Examiner* — Michael C Miggins
(74) *Attorney, Agent, or Firm* — Oliff PLC

(57) ABSTRACT

A layered sheet has a substrate layer and surface layers provided on both surfaces of the substrate layer, wherein the surface layers contain 50 to 90 mass % of component (A) defined below and 10 to 50 mass % of component (B) defined below relative to the overall mass of the surface layer; the substrate layer is composed of a vinyl aromatic hydrocarbon resin composition containing monomer units derived from conjugated dienes; and a percentage of the monomer units derived from the conjugated dienes in the substrate layer is 6 to 14 mass % relative to all monomer units in the vinyl aromatic hydrocarbon-based resin composition. Component (A) is a rubber-modified (meth)acrylic acid ester-vinyl aromatic hydrocarbon copolymer in which the percentage of a conjugated diene rubber component is 5 to 25 mass %. Component (B) is a polymeric antistatic agent.

11 Claims, 1 Drawing Sheet

(56) References Cited

U.S. PATENT DOCUMENTS

| | | |
|---|---|---|
| 2013/0189496 A1 | 7/2013 | Fujiwara et al. |
| 2013/0209742 A1 | 8/2013 | Fujiwara et al. |
| 2013/0209748 A1 | 8/2013 | Fujiwara et al. |
| 2013/0295307 A1 | 11/2013 | Fujiwara et al. |

FOREIGN PATENT DOCUMENTS

| | | |
|---|---|---|
| JP | 2003-055526 A | 2/2003 |
| JP | 2003-253069 A | 9/2003 |
| JP | 2004-230780 A | 8/2004 |
| JP | 2006-281452 A | 10/2006 |
| JP | 2011-042072 A | 3/2011 |
| JP | 2014-009337 A | 1/2014 |
| JP | 2015-096595 A | 5/2015 |
| WO | 2012/046815 A1 | 4/2012 |
| WO | 2012/102287 A1 | 8/2012 |
| WO | 2018/084129 A1 | 5/2018 |

OTHER PUBLICATIONS

Jul. 21, 2020 International Search Report issued in International Patent Application No. PCT/JP2020/016651.

\* cited by examiner

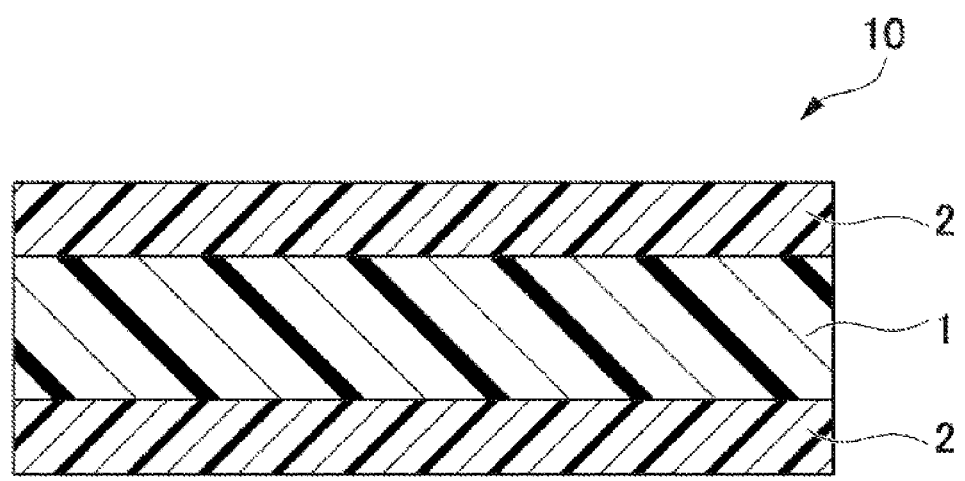

LAYERED SHEET, ELECTRONIC COMPONENT PACKAGING CONTAINER, AND ELECTRONIC COMPONENT PACKAGING

TECHNICAL FIELD

The present invention relates to a layered sheet, an electronic component packaging container, and an electronic component packaging.

BACKGROUND

Carrier tapes used for mounting electronic components such as ICs and LSIs on electronic devices include those obtained by thermoforming, into embossed shapes, sheets composed of thermoplastic resins, such as vinyl chloride resins, vinyl aromatic hydrocarbon-based resins, polycarbonate-based resins, and polyethylene terephthalate-based resins. These carrier tapes use opaque sheets that have been made conductive, for example, by including a conductive filler, such as carbon black, in the thermoplastic resin for the purpose of providing measures for preventing electrostatic damage to the electronic components housed in the embossed portions (also known as pockets). Meanwhile, as carrier tapes for housing electronic components, e.g., capacitors, that have a low likelihood of being destroyed by electrostatic damage, transparent-type carrier tapes having, as substrates, thermoplastic resins with relatively good transparency among the aforementioned resins are used for allowing the electronic components that are contained therein to be seen from the outside, and for being advantageous in terms of detecting characters printed on the electronic components.

As sheets for use in transparent-type carrier tapes, for example, sheets obtained by mixing a vinyl aromatic hydrocarbon polymer with a vinyl aromatic hydrocarbon-conjugated diene block copolymer (see Patent Documents 1 and 2), sheets using a rubber-modified (meth)acrylic acid ester-vinyl aromatic hydrocarbon copolymer (Patent Document 3), and the like have been proposed.

Aside from the aforementioned transparency, a balance of various physical properties such as bending resistance (folding endurance), antistatic properties, and moldability is sought in carrier tapes. However, conventional layered sheets for use in carrier tapes have the problem that it is difficult to fully satisfy these various properties.

Additionally, in carrier tapes, burrs are formed at the cut faces when an original sheet is slit or when sprocket holes or the like are punched out during embossment. For this reason, layered sheets for use in carrier tapes that do not tend to form burrs are sought.

CITATION LIST

Patent Literature

Patent Document 1: JP 2003-055526 A
Patent Document 2: JP 2002-332392 A
Patent Document 3: JP 2003-253069 A

SUMMARY OF INVENTION

Technical Problem

Thus, an objective of the present invention is to provide a layered sheet that has an excellent balance of physical properties such as bending resistance, antistatic properties, and moldability, and that does not tend to form burrs, as well as an electronic packaging container and an electronic component packaging using the layered sheet.

Solution to Problem

As a result of diligently studying these problems, the present inventors discovered that all of the problems can be solved by a layered sheet having surface layers containing a polymeric antistatic agent and a rubber-modified (meth) acrylic acid ester-vinyl aromatic hydrocarbon copolymer containing a specific amount of a conjugated diene rubber component, and having a substrate layer composed of a vinyl aromatic hydrocarbon-based resin composition containing conjugated diene monomer units, wherein the number of conjugated diene monomer units in the substrate layer is within a specified range, thereby completing the present invention.

Specifically, the present invention includes the embodiments indicated below.

[1] A layered sheet having a substrate layer and surface layers provided on both surfaces of the substrate layer, wherein the surface layers contain 50 to 90 mass % of component (A) defined below and 10 to 50 mass % of component (B) defined below relative to the overall mass of the surface layer; the substrate layer is composed of a vinyl aromatic hydrocarbon-based resin composition containing monomer units derived from conjugated dienes; and a percentage of the monomer units derived from the conjugated dienes in the substrate layer is 6 to 14 mass % relative to all monomer units in the vinyl aromatic hydrocarbon-based resin composition;

component (A) being a rubber-modified (meth)acrylic acid ester-vinyl aromatic hydrocarbon copolymer in which a percentage of a conjugated diene rubber component is 5 to 25 mass %; and component (B) being a polymeric antistatic agent.

[2] The layered sheet according to [1], wherein the vinyl aromatic hydrocarbon-based resin composition contains 30 to 70 mass % of component (C) defined below, 30 to 70 mass % of component (D) defined below, and 0 to 40 mass % of recycled layered sheet material relative to the overall mass of the vinyl aromatic hydrocarbon-based resin composition;

component (C) being a vinyl aromatic hydrocarbon-conjugated diene block copolymer; and component (D) being at least one polymer selected from the group consisting of vinyl aromatic hydrocarbon polymers and rubber-modified vinyl aromatic hydrocarbon polymers.

[3] The layered sheet according to [1] or [2], wherein the polymeric antistatic agent is a block copolymer having, in a molecular chain, a hydrophilic block and at least one block selected from the group consisting of polyolefin-based blocks and polyamide-based blocks.

[4] The layered sheet according to any one of [1] to [3], wherein the thickness ratio between the layers in the layered sheet, represented by surface layer/substrate layer, is 10/90 to 50/50.

[5] The layered sheet according to any one of [1] to [4], wherein the layered sheet has an image clarity, as measured by a measurement method in accordance with the JIS-K-7374 standard, of 40% or higher.

[6] The layered sheet according to any one of [1] to [5], wherein the layered sheet has a tensile modulus, as measured by a measurement method in accordance with the JIS-K-7127 standard, of 1200 to 2000 MPa.

[7] The layered sheet according to any one of [1] to [6], wherein the layered sheet has a folding endurance, as measured by a measurement method in accordance with the JIS-P-8115 standard, of 30 times or more.

[8] The layered sheet according to any one of [1] to [7], wherein a punching burr formation rate is less than 10%.

[9] An electronic component packaging container using the layered sheet according to any one of [1] to [8].

[10] The electronic component packaging container according to [9], wherein the electronic component packaging container is a carrier tape.

[11] The electronic component packaging container according to [10], wherein the electronic component packaging container is a tray.

[12] An electronic component packaging using the electronic component packaging container according to any one of [9] to [11].

Effects of Invention

The present invention can provide a layered sheet that has an excellent balance of physical properties such as bending resistance, antistatic properties, and moldability, and that does not tend to form burrs, as well as an electronic packaging container and an electronic component packaging using the layered sheet.

BRIEF DESCRIPTION OF DRAWINGS

FIG. 1 is a section view representing one embodiment of the layered sheet of the present invention.

DESCRIPTION OF EMBODIMENTS

Hereinafter, the present invention will be explained in detail. However, the present invention is not limited to the embodiments described below.

[Layered Sheet]

The present invention is a layered sheet having a substrate layer and surface layers provided on both surfaces of the substrate layer, wherein the surface layers contain 50 to 90 mass % of component (A) defined below and 10 to 50 mass % of component (B) defined below relative to the overall mass of the surface layer; the substrate layer is composed of a vinyl aromatic hydrocarbon-based resin composition containing monomer units derived from conjugated dienes; and a percentage of the monomer units derived from the conjugated dienes in the substrate layer is 6 to 14 mass % relative to all monomer units in the vinyl aromatic hydrocarbon-based resin composition;

component (A) being a rubber-modified (meth)acrylic acid ester-vinyl aromatic hydrocarbon copolymer in which a percentage of a conjugated diene rubber component is 5 to 25 mass %; and component (B) being a polymeric antistatic agent.

By having the above-mentioned features, the layered sheet of the present invention has an excellent balance of physical properties such as bending resistance (folding endurance), antistatic properties, and moldability, and can effectively suppress burr formation. FIG. 1 is a section view representing one embodiment of the layered sheet of the present invention. The layered sheet 10 is provided with surface layers 2 on both surfaces of the substrate layer 1.

Hereinafter, the structure of the layered sheet of the present invention will be explained in detail.

<Surface Layer>

The layered sheet of the present invention comprises surface layers provided on both surfaces of the substrate layer. Additionally, the surface layers contain the aforementioned component (A) and component (B). That is, the surface layers are composed of a resin composition containing component (A) and component (B).

(Component (A))

Component (A) is a rubber-modified (meth)acrylic acid ester-vinyl aromatic hydrocarbon copolymer in which the percentage of a conjugated diene rubber component is 5 to 25 mass %. In this case, "percentage of a conjugated diene rubber component" refers to the amount of a conjugated diene rubber component that is contained relative to the overall mass of component (A).

Component (A) is obtained by copolymerizing a (meth)acrylic acid ester-based monomer with a vinyl aromatic hydrocarbon-based monomer in the presence of a rubber component. Additionally, component (A) has a structure in which a rubber component resulting from the graft polymerization of the (meth)acrylic acid ester-based monomer with the vinyl aromatic hydrocarbon-based monomer is dispersed, in the form of islands, within a resin phase comprising a copolymer of the (meth)acrylic acid ester-based monomer and the vinyl aromatic hydrocarbon-based monomer.

The "rubber component" in component (A) refers to a "conjugated diene rubber component". The conjugated diene constituting the conjugated diene rubber component may, for example, be 1,3-butadiene (butadiene), 2-methyl-1,3-butadiene (isoprene), 2,3-dimethyl-1,3-butadiene, 1,3-pentadiene, 1,3-hexadiene, 2-methylpentadiene, or the like. Among the above, butadiene and isoprene are preferable. These conjugated dienes may be used as a single type alone, or as a combination of two or more types.

The percentage of the conjugated diene component in component (A) is 5 to 25 mass %, preferably 7 to 23 mass %, and more preferably 9 to 21 mass % for the purposes of the balance of physical properties, such as the folding endurance, the moldability, and the transparency, of the layered sheet.

The (meth)acrylic acid ester-based monomer is a derivative of an acrylic acid ester or a methacrylic acid ester, and may, for example, be methyl methacrylate, ethyl methacrylate, methyl acrylate, ethyl acrylate, n-butyl acrylate, 2-methylhexyl acrylate, 2-ethylhexyl acrylate, or the like. These may be used as a single type alone or as a combination of two or more types. Among the above, methyl methacrylate and n-butyl acrylate are preferable for the purposes of productivity and transparency of the layered sheet.

The vinyl aromatic hydrocarbon-based monomer is styrene or a derivative thereof. The derivative may, for example, be α-methylstyrene, p-methylstyrene, o-methylstyrene, p-t-butylstyrene, or the like. These may be used as a single type alone or as a combination of two or more types. Among the above, styrene is preferable.

These monomers may be copolymerized, as needed, with a vinyl-based monomer that is copolymerizable therewith, for example, acrylic acid, methacrylic acid, acrylonitrile, N-phenylmaleimide, N-cyclohexylmaleimide, or the like.

Component (A) may be produced by a conventionally known polymerization method such as emulsion polymerization or solution polymerization.

The percentage of the conjugated diene rubber component in component (A) can be adjusted by means of a conventionally known method in the component (A) production stage. Additionally, a commercially available rubber-modified (meth)acrylic acid ester-vinyl aromatic hydrocarbon copolymer containing a conjugated diene rubber component at a percentage of 5 to 25 mass % may be used as component (A). Additionally, component (A) may be composed of only one type of rubber-modified (meth)acrylic acid ester-vinyl aromatic hydrocarbon copolymer, or may be a mixture of two or more types of rubber-modified (meth)acrylic acid ester-vinyl aromatic hydrocarbon copolymers. In the case in which component (A) is a mixture of two or more types, the percentage of conjugated diene components relative to the overall mass of the mixture is adjusted to be within the range 5 to 25 mass %.

The percentage of component (A) in the surface layers is 50 to 90 mass %, preferably 60 to 85 mass %, and more preferably 70 to 80 mass % relative to the overall mass of the surface layers (i.e., relative to the overall mass of the resin composition constituting the surface layers). If the percentage of component (A) in the surface layers is 50 to 90 mass %, then the aforementioned layered sheet having an excellent balance of physical properties can be obtained. The layered sheet in the present invention is provided with surface layers on both surfaces of the substrate layer (i.e., it has a surface layer (I) provided on the upper surface of the substrate layer and a surface layer (II) provided on the lower surface of the substrate layer). In one embodiment of the present invention, the percentages of component (A) contained in surface layer (I) and in surface layer (II) may be the same or different. The percentages of component (A) in surface layer (I) and surface layer (II) are preferably the same for the purposes of moldability and antistatic properties. The percentage of component (A) in the surface layers refers to the amount of component (A) contained relative to the overall mass of surface layer (I) and surface layer (II).

In one embodiment of the present invention, the mass-average molecular weight of component (A) is preferably 110,000 to 170,000, and more preferably 120,000 to 160,000. If the mass-average molecular weight of component (A) is within the aforementioned ranges, then good productivity or moldability of the layered sheet tends to be obtained. The mass-average molecular weight of component (A) refers to a value determined by using GPC (gel permeation chromatography) and converted on the basis of a standard polystyrene equivalent.

(Component (B))

Component (B) is a polymeric antistatic agent. The polymeric antistatic agent may, for example, be a block copolymer that has a number-average molecular weight of 2000 or higher, and that has, in a molecular chain, a hydrophilic block and at least one block selected from the group consisting of polyolefin-based blocks and polyamide-based blocks. As such polymeric antistatic agents constituted by block copolymers, for example, the polymeric antistatic agents described in JP 2001-278985 A and JP 2015-96595 A may be used. The number-average molecular weight refers to a value determined by using GPC and converted on the basis of a standard polystyrene equivalent.

The olefin-based monomer units constituting the polyolefin-based blocks may, for example, be C2 to C6 olefins such as ethylene, propylene, and 1-butene. The percentage of these C2 to C6 olefin-based monomers in the polyolefin-based blocks is preferably 80 mol % or higher, and more preferably 90 mol % or higher. Additionally, among these olefin-based monomer units, at least one type selected from ethylene and propylene is preferable. Additionally, as the olefin-based monomer, propylene is particularly preferable. The percentage of propylene in the olefin-based monomers is preferably 80 mol % or higher, and particularly preferably 90 mol % or higher. The number-average molecular weight of the polyolefin-based blocks is, for example, 1000 to 50000, preferably 3000 to 40000, and more preferably approximately 5000 to 30000. The percentage of the polyolefin-based blocks in the block copolymer is, for example, 20 to 70 wt %, preferably approximately 25 to 50 wt % relative to the overall mass of the block copolymer. The number-average molecular weight refers to a value determined by using GPC and converted on the basis of a standard polystyrene equivalent.

The polyamide-based blocks may, for example, be blocks obtained by a condensation reaction between a diamine and a dicarboxylic acid, blocks obtained by a condensation reaction between aminocarboxylic acids, blocks obtained by ring-opening polymerization of a lactam, blocks obtained by copolymerization of these components, or the like.

The diamine may, for example, be a C4 to C20 aliphatic amine or the like, such as hexamethylenediamine.

The dicarboxylic acid may, for example, be a C4 to C20 aliphatic dicarboxylic acid or the like, such as adipic acid, sebacic acid, or dodecanedioic acid.

The aminocarboxylic acid may, for example, be a C4 to C20 aminocarboxylic acid or the like, such as 6-aminohexanoic acid or 12-aminododecanoic acid.

The lactam may, for example, be a C4 to C20 lactam or the like, such as caprolactam. The above-mentioned components may be used as a single type alone, or as a combination of two or more types. Among the above, blocks obtained by a condensation reaction between a diamine and a dicarboxylic acid, and blocks obtained by a condensation reaction between aminocarboxylic acids are preferable.

The number-average molecular weight of the polyamide-based blocks should, for example, be 1000 to 50000, preferably 3000 to 40000, and more preferably approximately 5000 to 30000. The percentage of polyamide-based blocks in the block copolymer may, for example, be 20 to 70 wt %, and preferably approximately 25 to 50 wt % relative to the overall mass of the block copolymer. The number-average molecular weight refers to a value determined by using GPC and converted on the basis of a standard polystyrene equivalent.

The hydrophilic block may, for example, be a block composed of a polymer such as a polyether-based polymer, or a non-ionic polymer, a cationic polymer, or an anionic polymer having hydroxyl groups in the structure thereof. Among the above, the polymer constituting the hydrophilic block is preferably a polyether-based polymer, and is more preferably a polyalkylene oxide, which is a polymer of C2 to C4 alkylene oxides. The degree of polymerization of the polyalkylene oxide is preferably 1 to 300, more preferably 5 to 200, even more preferably 10 to 150, and particularly preferably 10 to 100.

The percentage of hydrophilic blocks in the block copolymer, for example, is preferably 20 to 90 mass %, and more preferably 25 to 80 mass % relative to the overall mass of the block copolymer.

The polyolefin-based blocks and the hydrophilic blocks are bonded by ester bonds, amide bonds, ether bonds, urethane bonds, imide bonds, or the like. These bonds may, for example, be formed by modifying a polyolefin with a modifier, then introducing the hydrophilic blocks. For example, after modifying the polyolefin with a modifier and introducing active hydrogen atoms, a hydrophilic monomer such as alkylene oxide is introduced by addition polymerization. Such a modifier may, for example, be an unsaturated carboxylic acid or an anhydride thereof (such as maleic acid (anhydride)), a lactam or an aminocarboxylic acid (such as caprolactam), oxygen or ozone, a hydroxyamine (such as 2-aminoethanol), a diamine (such as ethylenediamine), or a mixture thereof.

The polyamide blocks and the hydrophilic blocks are bonded by ester bonds, amide bonds, ether bonds, urethane bonds, imide bonds, or the like. These bonds may, for example, be formed by bonding, with a glycidyl ether compound or the like (for example, a bisphenol A glycidyl ether), a polyether-based polymer and a polyamide having functional groups at both ends thereof.

Component (B) is preferably a block copolymer having polyamide-based blocks and hydrophilic blocks in the molecular chain, more preferably a block copolymer having polyamide-based blocks and blocks composed of a polyether-based polymer in the molecular chain, and particularly preferably a polyether ester amide.

The percentage of component (B) in the surface layers is 10 to 50 mass %, preferably 15 to 40 mass %, and more preferably 20 to 30 mass % relative to the overall mass of the surface layers. If the percentage of component (B) in the surface layers is 10 to 50 mass %, then a layered sheet with excellent antistatic properties can be obtained. The percentages of component (B) contained in surface layer (I) and surface layer (II) may be the same or different, but should preferably be the same for the purposes of moldability and antistatic properties. The percentage of component (B) in the surface layers refers to the amount of component (B) contained relative to the overall mass of the surface layers.

The surface layers in the present invention may contain other components aside from the aforementioned components (A) and (B). The other components may, for example, be the below-described component (C), component (D), or the like. In one embodiment of the present invention, surface layer (I) and surface layer (II) in the layered sheet are preferably composed only of component (A) and component (B).

In the surface layers of the layered sheet of the present invention, component (A) and component (B) can be blended within a range such that the total amount thereof does not exceed 100 mass %.

<Substrate Layer>

In the layered sheet in the present invention, the substrate layer is composed of a vinyl aromatic hydrocarbon-based resin composition including monomer units derived from conjugated dienes. By being provided with such a substrate layer, the layered sheet of the present invention has an excellent balance of physical properties such as bending resistance (folding endurance), antistatic properties, and moldability, and can effectively suppress burr formation. In this case, "a vinyl aromatic hydrocarbon-based resin composition including monomer units derived from conjugated dienes" refers to a composition containing a resin having monomer units derived from conjugated dienes in the molecular structure. That is, the vinyl aromatic hydrocarbon-based resin composition may be a mixture of multiple types of resins.

The percentage of the monomer units derived from conjugated dienes in the substrate layer is 6 to 14 mass %, preferably 7 to 13 mass %, and more preferably 8 to 12 mass % relative to all monomer units in the vinyl aromatic hydrocarbon-based resin composition. If the percentage of monomer units derived from conjugated dienes in the substrate layer is 6 to 14 mass %, then good moldability is obtained and the rate of burr formation can be reduced. The percentage of monomer units derived from conjugated dienes in the substrate layer may, for example, be computed by analyzing the substrate layer in a layered sheet with a Fourier transform infrared spectroscope (FT-IR) or the like.

In one embodiment of the present invention, the vinyl aromatic hydrocarbon-based resin composition preferably contains component (C) and component (D) defined below.

Component (C) is a vinyl aromatic hydrocarbon-conjugated diene block copolymer.

Component (D) is at least one polymer selected from the group consisting of vinyl aromatic hydrocarbon polymers and rubber-modified vinyl aromatic hydrocarbon polymers.

(Component (C))

Component (C) is a vinyl aromatic hydrocarbon-conjugated diene block copolymer. Component (C) contained in the vinyl aromatic hydrocarbon-based resin composition is a polymer including, in the structure thereof, blocks mainly composed of a vinyl aromatic hydrocarbon-based monomer and blocks mainly composed of a conjugated diene monomer.

The vinyl aromatic hydrocarbon-based monomer may, for example, be styrene, o-methylstyrene, p-methylstyrene, p-t-butylstyrene, 1,3-dimethylstyrene, α-methylstyrene, vinylnaphthalene, vinylanthracene, 1,1-diphenylethylene, or the like, among which styrene is preferable. The vinyl aromatic hydrocarbon-based monomer may be used as a single type alone, or as a combination of two or more types.

The conjugated diene-based monomer may, for example, be 1,3-butadiene (butadiene), 2-methyl-1,3-butadiene (isoprene), 2,3-dimethyl-1,3-butadiene, 1,3-pentadiene, 1,3-hexadiene, 2-methylpentadiene, or the like. Among the above, butadiene and isoprene are preferable. The conjugated diene monomer may be used as a single type alone, or as a combination of two or more types.

Blocks composed mainly of vinyl aromatic hydrocarbon monomers refer to both blocks composed only of structures derived from vinyl aromatic hydrocarbon-based monomers and blocks containing 50 mass % or more of structures derived from vinyl aromatic hydrocarbon-based monomers. Additionally, blocks composed mainly of conjugated diene-based monomers refer to both blocks composed only of structures derived from conjugated diene-based monomers and blocks containing 50 mass % or more of structures derived from conjugated diene-based monomers. The vinyl aromatic hydrocarbon-conjugated diene block copolymer may be produced by a conventionally known polymerization method such as emulsion polymerization or solution polymerization.

The amount of the monomer units derived from conjugated dienes contained in component (C) is 15 to 30 mass %, preferably 20 to 25 mass %, relative to all monomer units in the vinyl aromatic hydrocarbon-conjugated diene block copolymer for the purposes of the balance between the strength, the moldability and the like in the layered sheet of the present invention. The amount of the monomer units derived from conjugated dienes contained in component (C) can be adjusted by means of a conventionally known method in the component (C) production stage. Additionally, a commercially available vinyl aromatic hydrocarbon-conjugated diene block copolymer containing monomer units derived from conjugated dienes in the above-mentioned range may be used as component (C). In the present invention, component (C), which contains monomer units derived from conjugated dienes in the above-mentioned range, may be a single type used alone, or may be a combination of two or more types. Additionally, as the percentage of monomer units derived from conjugated dienes in component (C), a value computed by the aforementioned FT-IR may also be used.

In one embodiment of the present invention, the percentage of component (C) in the vinyl aromatic hydrocarbon-based resin composition constituting the substrate layer is preferably 30 to 70 mass %, more preferably 35 to 60 mass % relative to the overall mass of the vinyl aromatic hydrocarbon-based resin composition. If the amount of component (C) that is contained is 30 to 70 mass %, then the moldability tends to be better and a burr formation rate reduction effect tends to be obtained. Additionally, the percentage of monomer units derived from conjugated dienes in the substrate layer can easily be adjusted to be within the range 7 to 13 mass %.

In one embodiment of the present invention, the mass-average molecular weight of component (C) is preferably 80,000 to 220,000, and more preferably 100,000 to 200,000. If the mass-average molecular weight of component (C) is within the aforementioned range, then the productivity and the moldability of the layered sheet tend to be better and a burr formation rate reduction effect tends to be obtained. The mass-average molecular weight of component (C), as with components (A) and (B), refers to a value determined by using GPC and converted on the basis of a standard polystyrene equivalent.

(Component (D))

Component (D) is at least one polymer selected from the group consisting of vinyl aromatic hydrocarbon polymers and rubber-modified vinyl aromatic hydrocarbon polymers.

The vinyl aromatic hydrocarbon polymers in component (D) are composed, most generally, of so-called general-purpose polystyrenes (GPPS), which are styrene homopolymers, but they may contain, as trace components, one or more types of aromatic vinyl monomers such as o-methylstyrene, p-methylstyrene, p-tert-butylstyrene, 1,3-dimethylstyrene, α-methylstyrene, vinylnaphthalene, vinylanthracene, and 1,1-diphenylethylene.

The mass-average molecular weight of the GPPS is preferably 100,000 to 400,000, and more preferably 150,000 to 350,000. If the mass-average molecular weight is within the aforementioned range, then the productivity and the moldability of the layered sheet tend to be better and a burr formation rate reduction effect tends to be obtained. The aforementioned mass-average molecular weight refers to a value determined by using GPC and converted on the basis of a standard polystyrene equivalent.

The rubber-modified vinyl aromatic hydrocarbon polymers in component (D) are composed, most generally, of so-called high-impact polystyrenes (HIPS) that are obtained by polymerizing a styrene monomer in the presence of a rubber component, and that have a rubber component, obtained by graft polymerization of the styrene monomer, dispersed in the form of islands in a resin phase comprising polystyrene. The above may contain, as trace components, one or more types of aromatic vinyl monomers such as o-methylstyrene, p-methylstyrene, p-tert-butylstyrene, 1,3-dimethylstyrene, α-methylstyrene, vinylnaphthalene, vinylanthracene, and 1,1-diphenylethylene.

As the rubber component, for example, a conjugated diene-based rubber containing 1,3-butadiene (butadiene), 2-methyl-1,3-butadiene (isoprene), 2,3-dimethyl-1,3-butadiene, 1,3-pentadiene, 1,3-hexadiene, 2-methylpentadiene, or the like as monomers may be used. Among the above, butadiene and isoprene are preferable. These conjugated diene-based rubbers may be used as a single type alone, or as a combination of two or more types.

The percentage of monomer units derived from conjugated dienes in the rubber-modified vinyl aromatic hydrocarbon polymer is preferably 3 to 15 mass %, and more preferably 5 to 10 mass % relative to all monomer units in the rubber-modified vinyl aromatic hydrocarbon polymer. The percentage of monomer units derived from conjugated dienes in component (D) may be computed by the aforementioned FT-IR.

In one embodiment of the present invention, the mass-average molecular weight of the rubber-modified vinyl aromatic hydrocarbon polymer in component (D) is preferably 100,000 to 400,000, and more preferably 150,000 to 350,000. If the mass-average molecular weight is within the aforementioned range, then the productivity and the moldability of the layered sheet tend to be better and a burr formation rate reduction effect tends to be obtained. The mass-average molecular weight of the rubber-modified vinyl aromatic hydrocarbon polymer refers to a value determined by using GPC and converted on the basis of a standard polystyrene equivalent.

Component (D) may be a mixture of a vinyl aromatic hydrocarbon polymer and a rubber-modified vinyl aromatic hydrocarbon polymer.

In one embodiment of the present invention, component (D) contained in the vinyl aromatic hydrocarbon-based resin composition preferably contains at least a vinyl aromatic hydrocarbon polymer. Additionally, in one embodiment of the present invention in the case in which component (D) contains both a vinyl aromatic hydrocarbon polymer and a rubber-modified vinyl aromatic hydrocarbon polymer, the amount of the vinyl aromatic hydrocarbon polymer that is contained relative to the overall mass of component (D) is preferably 60 to 80 mass %.

In one embodiment of the present invention, the percentage of component (D) in the vinyl aromatic hydrocarbon-based resin composition constituting the substrate layer is preferably 30 to 70 mass %, and more preferably 40 to 60 mass % relative to the overall mass of the vinyl aromatic hydrocarbon-based resin composition. If the amount of component (D) that is contained is 30 to 70 mass %, then the tensile modulus of the layered sheet tends to be in an appropriate range, and the folding endurance tends not to become lower.

In the substrate layer of the layered sheet of the present invention, component (C) and component (D) in the vinyl aromatic hydrocarbon-based resin composition may be blended by being adjusted so that the total amount thereof is within a range not exceeding 100 mass %.

(Recycled Material)

The vinyl aromatic hydrocarbon-based resin composition constituting the substrate layer may further contain a recycled material. The percentage thereof is preferably 0 to 40 mass %, and more preferably 5 to 25 mass % relative to the overall mass of the vinyl aromatic hydrocarbon-based resin composition. Recycled material refers to portions that cannot be directly used as products, such as the scraps that are generated by trimming both ends of a sheet that has been extruded from a die when producing a layered sheet by extrusion molding, or the starting portion when rolling up a sheet, these portions being pulverized and re-pelletized. It is extremely important, in terms of the productivity of the layered sheets, for the properties of the layered sheet to remain satisfactory even when such recycled materials are added. If the recycled material contained in a vinyl aromatic hydrocarbon-based resin composition constituting the substrate layer of the present invention is within 40 mass %, then the transparency of the layered sheet does not tend to become lower.

In one embodiment of the present invention, a material derived from the layered sheet of the present invention may be used as the recycled material. That is, a recycled raw material obtained by pulverizing and pelletizing a layered sheet having the substrate layer and the surface layers of the present invention may be contained in the vinyl aromatic hydrocarbon-based resin composition.

In one embodiment of the present invention, the thickness ratio between the layers in the layered sheet, represented by surface layer/substrate layer, is preferably 10/90 to 50/50, and more preferably 14/86 to 30/70. If the thickness ratio between the layers is within the aforementioned range, then the antistatic properties and the moldability tend to be better and a burr formation rate reduction effect tends to be obtained. The thickness of the surface layers is the total value of the thicknesses of the aforementioned surface layer (I) and surface layer (II). That is, "the thickness ratio between the layers in the layered sheet, represented by surface layer/substrate layer, is 10/90 to 50/50" means the ratio between "the total thickness of the multiple surface layers" and "the thickness of the substrate layer" when the overall thickness of the layered sheet of the present invention is represented by 100.

Additionally, the overall thickness of the layered sheet in the present invention, though not particularly limited as long as the effects of the present invention are obtained, should generally be within the range 100 to 700 µm.

<Image Clarity>

In one embodiment of the present invention, the image clarity of the layered sheet, measured by a measurement method in accordance with the JIS-K-7374 standard, is preferably 40% or higher, and more preferably 60% or higher. When the image clarity is 40% or higher, components housed in a pocket can be easily seen. That is, good transparency tends to be obtained.

<Tensile Modulus>

In one embodiment of the present invention, the tensile modulus of the layered sheet, measured by a measurement method in accordance with the JIS-K-7127 standard, is preferably 1200 to 2000 MPa, and more preferably 1300 to 1900 MPa. The tensile modulus refers to the tensile modulus of the layered sheet in the sheet flow direction. In this case, the flow direction refers to the machine direction (MD direction) of the layered sheet when the layered sheet is being produced. If the tensile modulus is within this range, then the rigidity, which is necessary for the pockets, does not tend to decrease when molding a carrier tape, and a good molded article tends to be obtained. Additionally, the folding endurance does not tend to decrease.

<Folding Endurance>

In one embodiment of the present invention, the folding endurance of the layered sheet, measured by a measurement method in accordance with the JIS-P-8115 standard, is preferably 30 times or more, and more preferably 100 times or more. If the folding endurance is 30 times or more, then the layered sheet tends not to break.

<Burr Formation Rate>

In one embodiment of the present invention, the punching burr formation rate of the layered sheet is preferably less than 10%. The layered sheet of the present invention is provided with surface layers and a substrate layer containing components with the aforementioned characteristics, and thus can suppress burr formation. That is, the punching burr formation rate can easily be suppressed to be less than 10%.

The punching burr formation rate is a value computed by the method indicated below.

A vacuum rotary molding machine is used to punch a hole having a diameter of 4 mm in a sheet sample of a layered sheet. Thereafter, the hole is observed by using an optical microscope, the total area of burrs adhered to the hole is computed, and the punching burr formation rate is computed by means of Expression (1) defined below.

$$\text{Punching burr formation rate (\%)} = (\text{Area of burrs (total)}/\text{area of hole}) \times 100 \quad (1)$$

<Moldability>

In one embodiment of the present invention, the moldability of the layered sheet can be evaluated, for example, by the precision of the thickness difference between the pocket bottom surface and the side-surface sheet when the layered sheet of the present invention is molded as carrier tape, in addition to setting the elastic modulus and the folding endurance to be within a suitable range. For example, in the layered sheet of the present invention, the thickness difference between the pocket bottom surface and the side surface sheet when molded into carrier tape is preferably ±20% or less.

[Layered Sheet Production Method]

The method for producing the layered sheet of the present invention is not particularly limited as long as the effects of the present invention are obtained, and a conventionally known method may be used. For example, the layered sheet is preferably produced, so that the aforementioned resin composition containing component (A) and component (B) forms surface layers and the aforementioned vinyl aromatic hydrocarbon-based resin composition forms a substrate layer, by a method of extrusion molding these resin compositions by using a multilayer T-die having a multi-manifold, or by T-die extrusion molding using a feedblock.

[Electronic Component Packaging Container]

By utilizing a known sheet forming method (thermoforming) method such as vacuum forming, compressed-air forming, and press forming, an electronic component packaging container of an arbitrary shape, such as a carrier tape or a tray, can be obtained from the layered sheet of the present invention. The layered sheet of the present invention has an excellent balance of physical properties such as folding endurance, antistatic properties, and moldability, and does not tend to form burrs. Thus, the layered sheet can be favorably used as an electronic component packaging container.

In other words, other embodiments of the layered sheet of the present invention include use or a method for use as an electronic component packaging container.

[Electronic Component Packaging]

The electronic component packaging container is prepared as an electronic component packaging by housing electronic components therein, and is used to store and transport the electronic components. For example, a carrier tape is used by housing electronic components in pockets formed therein by a molding method as mentioned above, then forming a carrier tape body by providing a lid by means of the carrier tape and rolling up the tapes on a reel. The carrier tape body is used for storing and transporting the electronic components.

In other words, other embodiments of the layered sheet of the present invention include use or a method for use as an electronic component packaging. Additionally, other embodiments of the layered sheet of the present invention include use or a method for use as an electronic component packaging container that can be used as an electronic component packaging.

The electronic components packaged in the electronic component packaging are not particularly limited, and for example, may be ICs, LEDs (light-emitting diodes), resistors, liquid crystal, capacitors, transistors, piezoresistors, filters, quartz oscillators, quartz vibrators, diodes, connectors, switches, volumes, relays, inductors, or the like. Additionally, they may be intermediate products or final products in which these electronic components are used.

Other embodiments of the present invention include those described below.

A layered sheet having a substrate layer and surface layers provided on both surfaces of the substrate layer, wherein the surface layers are composed of a resin composition comprising component (A) defined below and component (B) defined below, and the substrate layer is composed of a vinyl aromatic hydrocarbon-based resin composition comprising component (C) defined below and component (D) defined below, wherein the percentage of component (A) relative to the overall mass of the resin composition is 50 to 90 mass %, the amount of component (B) that is contained is 10 to 50 mass %, and the percentage of the monomer units derived from conjugated dienes in the vinyl aromatic hydrocarbon-based resin composition constituting the substrate layer is 5 to 13 mass %;

component (A) being a rubber-modified (meth)acrylic acid ester-vinyl aromatic hydrocarbon copolymer in which the percentage of a conjugated diene rubber component is 5 to 25 mass %;

component (B) being a polymeric antistatic agent;

component (C) being a vinyl aromatic hydrocarbon-conjugated diene block copolymer in which the percentage of monomer units derived from conjugated dienes is 10 to 35 mass %; and component (D) being at least one polymer selected from the group consisting of GPPS and HIPS.

The percentage of component (C) relative to the overall mass of the vinyl aromatic hydrocarbon-based resin composition is preferably 30 to 70 mass %, and the percentage of component (D) is preferably 30 to 70 mass %. Additionally, the vinyl aromatic hydrocarbon-based resin composition may further contain 0 to 40 mass % of a recycled material. The total amount of all of the components in the vinyl aromatic hydrocarbon-based resin composition does not exceed 100 mass %. Additionally, component (B) is preferably a polyether ester amide.

The layered sheet can be used as an electronic component packaging container. Additionally, it can be used as an electronic component packaging.

EXAMPLES

Hereinafter, the present invention will be explained in detail by indicating examples. However, the present invention is not limited by the descriptions below.

[Components (A) to (D), and Other Raw Ingredient Resins]

The components used in the examples and the comparative examples are indicated in Table 1. These components were prepared by known methods.

TABLE 1

| Component | Raw Material Resin | | Monomer Units Derived from Conjugated Dienes (mass %) |
|---|---|---|---|
| (A) | (A-1) | Rubber-modified (meth)acrylic acid ester- | 7 |
| | (A-2) | vinyl aromatic hydrocarbon copolymer | 19 |
| (A') | (A'-1) | Rubber-modified (meth)acrylic acid ester- | 2 |
| | (A'-2) | vinyl aromatic hydrocarbon copolymer | 30 |

TABLE 1-continued

| Component | Raw Material Resin | | Monomer Units Derived from Conjugated Dienes (mass %) |
|---|---|---|---|
| (B) | (B-1) | Polyether ester amide | — |
| (C) | (C-1) | Vinyl aromatic hydrocarbon-conjugated | 10 |
| | (C-2) | diene block copolymer | 17 |
| | (C-3) | | 20 |
| | (C-4) | | 27 |
| | (C-5) | | 35 |
| (D) | (D-1) | Vinyl aromatic hydrocarbon polymer (GPPS) | — |
| | (D-2) | Rubber-modified vinyl aromatic hydrocarbon polymer (HIPS) | 9 |

In this case, the amounts of monomer units derived from conjugated dienes contained in component (A) (component (A')), component (C), and component (D) were computed from the IR spectra of the raw material resins obtained by a Fourier transform infrared spectroscope (FT-IR) manufactured by JASCO Corp.

Example 1

<Preparation of Layered Sheet>

A layered sheet was prepared by setting the raw material resins and blend percentages used in the surface layers and the substrate layer to be as indicated in Table 2, using a feedblock method with a φ40 mm extruder (L/D=26) for the surface layers, a φ65 mm extruder for the substrate layer (L/D=28), and a 500 mm-wide T-die, and adjusting the proportional thicknesses so that surface layer/substrate layer/surface layer was 10/80/10 (i.e., the thickness ratio between the layers, represented by surface layers/substrate layer, was 20/80). The target thickness of the surface layers was 30 μm and the target thickness of the substrate layer was 240 μm. Additionally, the overall thickness of the layered sheet was 0.3 mm.

Examples 2-14 and Comparative Examples 1-8

Layered sheets were prepared by methods similar to that in Example 1, except that the raw material resins used in the surface layers and the substrate layer, the blend percentages, and the surface layers/substrate layer ratios were as indicated in Tables 2 and 3.

Reference Examples 1-3

Single-layer sheets with an overall thickness of 0.3 mm were obtained by setting the raw material resins and the blend percentages to be as indicated in Table 3, using a feedblock method with a φ65 mm extruder (L/D=28) and a 500 mm-wide T-die.

[Evaluation Method]

The layered sheets prepared in each example and comparative example were evaluated by the methods indicated below. Regarding the evaluation criteria for the image clarity, burr formation rate, antistatic properties, tensile modulus, folding endurance, and moldability evaluations indicated below, higher numbers indicate better performance.

(1) Image Clarity Evaluation

The image clarity was measured in accordance with the JIS-K-7374 standard, using an image clarity measurer. Additionally, the image clarity was evaluated in accordance with the evaluation criteria defined below, and a grade of "2" or higher was considered passing.
<Evaluation Criteria>
3: Image clarity at least 50% and at most 100%
2: Image clarity at least 30% and less than 50%
1: Image clarity less than 30%
(2) Burr Formation Rate Evaluation A vacuum rotary molding machine was used to punch a hole having a diameter of 4 mm in a sheet sample of a layered sheet. Thereafter, the hole was observed by using an optical microscope, the total area of burrs adhered to the hole was computed, and the punching burr formation rate was computed by means of Expression (1) defined below. Additionally, the burr formation rate was evaluated in accordance with the evaluation criteria defined below, and a grade of "2" or higher was considered passing.

$$\text{Punching burr formation rate (\%)} = (\text{Area of burrs (total)}/\text{area of hole}) \times 100 \quad (1)$$

<Evaluation Criteria>
3: Burr formation rate at least 0% and less than 5%
2: Burr formation rate at least 5% and less than 10%
1: Burr formation rate at least 10%
(3) Antistatic Properties Evaluation The surface resistivity of the layered sheets was measured in accordance with the ASTM-D-257 standard, in a 23° C., 50% RH environment. Regarding the antistatic properties, a measured surface resistivity of $10^{12}$ to $10^{13}$ Ω/sq. indicates effectiveness for preventing malfunctions in a rest state (preventing dust adhesion), and a value of $10^8$ to $10^{12}$ Ω/sq. indicates effectiveness for preventing malfunctions in an active state (preventing static accumulation even when static electricity is generated by friction or the like). Thus, the antistatic properties were evaluated in accordance with the evaluation criteria defined below, and a grade of "2" or higher was considered passing.
<Evaluation Criteria>
3: Surface resistivity less than $1.0 \times 10^{11}$ Ω/sq.
2: Surface resistivity at least $1.0 \times 10^{11}$ Ω/sq. and less than $1.0 \times 10^{12}$ Ω/sq.
1: Surface resistivity at least $1.0 \times 10^{12}$ Ω/sq.
(4) Tensile Modulus Evaluation The tensile modulus was measured in a type 5 testing piece sampled with the sheet flow direction in the lengthwise direction, in accordance with the JIS-K-7127 standard, using a VE-1D strograph manufactured by Toyo Seiki Seisakusho, Ltd. Additionally, the tensile modulus was evaluated in accordance with the evaluation criteria defined below, and a grade of "2" or higher was considered passing.
<Evaluation Criteria>
3: Tensile modulus at least 1200 MPa and at most 2000 MPa
2: Tensile modulus at least 1000 MPa and less than 1200 MPa
1: Tensile modulus less than 1000 MPa or more than 2000 MPa
(5) Folding Endurance Evaluation Test pieces were prepared so as to have a length of 150 mm, a width of 15 mm, and a thickness of 0.3 mm, sampled with the sheet flow direction in the lengthwise direction, in accordance with the JIS-P-8115 (2001) standard, and the MIT folding endurance was measured using an MIT folding endurance tester manufactured by Toyo Seiki Seisaku-sho, Ltd. At this time, the tests were performed with the folding angle set to 135°, the folding rate set to 175 times/min, and the measurement load set to 250 g. Additionally, the folding endurance was evaluated in accordance with the evaluation criteria defined below, and a grade of "2" or higher was considered passing.
<Evaluation Criteria>
3: Folding endurance at least 30 times
2: Folding endurance at least 10 times and less than 30 times
1: Folding endurance less than 10 times
(6) Moldability Evaluation A 24 mm-wide carrier tape was prepared by being formed with a compressed-air former under conditions in which the heater temperature was 210° C. The pocket size in the carrier tape was 15 mm in the flow direction, 11 mm in the width direction, and 5 mm in the depth direction. The pocket bottom surfaces and side surfaces were respectively cut out from this carrier tape, and a moldability evaluation was performed by means of a thickness measurement using a shape measurement laser microscope manufactured by Keyence Corp. Additionally, the moldability was evaluated in accordance with the evaluation criteria defined below, and a grade of "2" or higher was considered passing.
<Evaluation Criteria>
3: Measured thickness difference between pocket bottom surface and side surface sheet less than ±10%
2: Measured thickness difference between pocket bottom surface and side surface sheet at least ±10% and at most ±20%
1: Measured thickness difference between pocket bottom surface and side surface sheet more than ±20%

Evaluation results for sheets prepared from the respective examples, comparative examples, and reference examples are indicated together in Tables 2 and 3. In Table 3, the symbol "-" regarding the antistatic properties (surface resistance value) in Reference Examples 1 to 3 indicates that the surface resistance value was too high and exceeded the measurable range. Thus, the antistatic properties of these reference examples were evaluated with the grade "1" (surface resistivity at least $1.0 \times 10^{12}$ Ω/sq.).

TABLE 2

| | | | | Example | | | | | | |
|---|---|---|---|---|---|---|---|---|---|---|
| | | | | 1 | 2 | 3 | 4 | 5 | 6 | 7 |
| Surface Layer | Component (A) | (A-1) | (mass %) | | | | | | | |
| | | (A-2) | (mass %) | 80 | 80 | 90 | 80 | 50 | 80 | 80 |
| | Component (A') | (A'-1) | (mass %) | | | | | | | |
| | | (A'-2) | (mass %) | | | | | | | |
| | Component (B) | (B-1) | (mass %) | 20 | 20 | 10 | 20 | 50 | 20 | 20 |
| Substrate Layer | Vinyl aromatic Hydrocarbon-based resin composition | (C-1) | (mass %) | | | | | | | |
| | | (C-2) | (mass %) | | | | | | | |
| | | (C-3) | (mass %) | 30 | 50 | 43 | 43 | 43 | 38 | 50 |
| | | (C-4) | (mass %) | | | | | | | |
| | | (C-5) | (mass %) | | | | | | | |

TABLE 2-continued

|  |  |  |  |  |  |  |  |  |  |
|---|---|---|---|---|---|---|---|---|---|
|  |  | (D-1) | (mass %) | 56 | 50 | 43 | 43 | 43 | 38 | 40 |
|  |  | (D-2) | (mass %) |  |  |  |  |  |  | 10 |
|  |  | Recycled material | (mass %) | 14 |  | 14 | 14 | 14 | 24 |  |
|  | Monomer units derived from conjugated dienes |  | (mass %) | 7 | 10 | 10 | 10 | 10 | 9 | 11 |
| Structure | Thickness ratio (surface layers/substrate layer) |  | (—) | 20/80 | 20/80 | 20/80 | 20/80 | 20/80 | 20/80 | 20/80 |
| Evaluation Results | Image clarity |  | (%) | 65 | 80 | 65 | 65 | 65 | 55 | 70 |
|  |  |  | (Results) | 3 | 3 | 3 | 3 | 3 | 3 | 3 |
|  | Burr formation rate (%) |  | (%) | 2.5 | 3.5 | 3.5 | 3.5 | 3.5 | 3.0 | 3.5 |
|  |  |  | (Results) | 3 | 3 | 3 | 3 | 3 | 3 | 3 |
|  | Antistatic properties |  | (Ω/sq.) | $4.0 \times 10^8$ | $4.1 \times 10^8$ | $3.1 \times 10^8$ | $4.4 \times 10^8$ | $3.1 \times 10^8$ | $4.2 \times 10^8$ | $4.2 \times 10^8$ |
|  | (surface resistance value) |  | (Results) | 3 | 3 | 3 | 3 | 3 | 3 | 3 |
|  | Tensile modulus |  | (MPa) | 2000 | 1500 | 1500 | 1500 | 1500 | 1500 | 1400 |
|  |  |  | (Results) | 3 | 3 | 3 | 3 | 3 | 3 | 3 |
|  | Folding endurance |  | (Times) | 40 | 200 | 200 | 200 | 40 | 200 | 500 |
|  |  |  | (Results) | 3 | 3 | 3 | 3 | 3 | 3 | 3 |
|  | Moldability |  | (%) | 7 | 8 | 8 | 8 | 3 | 8 | 3 |
|  |  |  | (Results) | 3 | 3 | 3 | 3 | 3 | 3 | 3 |

|  |  |  |  | Example |  |  |  |  |  |  |
|---|---|---|---|---|---|---|---|---|---|---|
|  |  |  |  | 8 | 9 | 10 | 11 | 12 | 13 | 14 |
| Surface Layer | Component (A) | (A-1) | (mass %) |  |  |  |  | 80 |  |  |
|  |  | (A-2) | (mass %) | 80 | 80 | 80 | 80 |  | 80 | 80 |
|  | Component (A') | (A'-1) | (mass %) |  |  |  |  |  |  |  |
|  |  | (A'-2) | (mass %) |  |  |  |  |  |  |  |
|  | Component (B) | (B-1) | (mass %) | 20 | 20 | 20 | 20 | 20 | 20 | 20 |
| Substrate Layer | Vinyl aromatic | (C-1) | (mass %) |  |  |  |  |  |  |  |
|  | Hydrocarbon- | (C-2) | (mass %) |  |  | 43 |  |  |  |  |
|  | based resin | (C-3) | (mass %) | 43 | 56 |  |  | 43 | 43 | 43 |
|  | composition | (C-4) | (mass %) |  |  |  | 43 |  |  |  |
|  |  | (C-5) | (mass %) |  |  |  |  |  |  |  |
|  |  | (D-1) | (mass %) | 26 | 30 | 43 | 43 | 43 | 43 | 43 |
|  |  | (D-2) | (mass %) | 17 |  |  |  |  |  |  |
|  |  | Recycled material | (mass %) | 14 | 14 | 14 | 14 | 14 | 14 | 14 |
|  | Monomer units derived from conjugated dienes |  | (mass %) | 12 | 13 | 0 | 13 | 10 | 10 | 10 |
| Structure | Thickness ratio (surface layers/substrate layer) |  | (—) | 20/80 | 20/80 | 20/80 | 20/80 | 20/80 | 10/90 | 50/50 |
| Evaluation Results | Image clarity |  | (%) | 60 | 65 | 65 | 65 | 65 | 65 | 60 |
|  |  |  | (Results) | 3 | 3 | 3 | 3 | 3 | 3 | 3 |
|  | Burr formation rate (%) |  | (%) | 3.5 | 4.0 | 2.5 | 4.0 | 3.0 | 3.5 | 4.5 |
|  |  |  | (Results) | 3 | 3 | 3 | 3 | 3 | 3 | 3 |
|  | Antistatic properties |  | (Ω/sq.) | $4.3 \times 10^8$ | $4.0 \times 10^8$ | $4.4 \times 10^8$ | $4.7 \times 10^8$ | $4.2 \times 10^8$ | $10 \times 10^8$ | $4.2 \times 10^8$ |
|  | (surface resistance value) |  | (Results) | 3 | 3 | 3 | 3 | 3 | 3 | 3 |
|  | Tensile modulus |  | (MPa) | 1500 | 1200 | 1500 | 1300 | 1300 | 1500 | 1500 |
|  |  |  | (Results) | 3 | 3 | 3 | 3 | 3 | 3 | 3 |
|  | Folding endurance |  | (Times) | 700 | >1000 | 200 | 600 | 400 | 200 | 200 |
|  |  |  | (Results) | 3 | 3 | 3 | 3 | 3 | 3 | 3 |
|  | Moldability |  | (%) | 8 | 9 | 9 | 8 | 9 | 8 | 12 |
|  |  |  | (Results) | 3 | 3 | 3 | 3 | 3 | 3 | 2 |

TABLE 3

|  |  |  |  | Comparative Example |  |  |  |  |
|---|---|---|---|---|---|---|---|---|
|  |  |  |  | 1 | 2 | 4 | 5 | 6 |
| Surface Layer | Component (A) | (A-1) | (mass %) |  |  |  |  |  |
|  |  | (A-2) | (mass %) | 80 | 80 | 95 | 40 | 80 | 80 |
|  | Component (A') | (A'-1) | (mass %) |  |  |  |  |  |  |
|  |  | (A'-2) | (mass %) |  |  |  |  |  |  |
|  | Component (B) | (B-1) | (mass %) | 20 | 20 | 5 | 60 | 20 | 20 |
| Substrate Layer | Vinyl aromatic | (C-1) | (mass %) |  |  |  |  | 50 |  |
|  | Hydrocarbon- | (C-2) | (mass %) |  |  |  |  |  |  |
|  | based resin | (C-3) | (mass %) | 4 | 82 | 43 | 50 |  |  |
|  | composition | (C-4) | (mass %) |  |  |  |  |  |  |
|  |  | (C-5) | (mass %) |  |  |  |  |  | 50 |

TABLE 3-continued

|  |  |  |  |  |  |  |  |  |  |
|---|---|---|---|---|---|---|---|---|---|
|  |  | (D-1) | (mass %) | 82 | 4 | 43 | 50 | 50 | 50 |
|  |  | (D-2) | (mass %) |  |  |  |  |  |  |
|  |  | Recycled material | (mass %) | 14 |  | 14 |  |  |  |
|  | Monomer units derived from conjugated dienes | | (mass %) | 1 | 19 | 10 | 10 | 5 | 18 |
| Structure | Thickness ratio (surface layers/ substrate layer) | | (—) | 20/60 | 20/80 | 20/80 | 20/80 | 20/80 | 20/80 |
|  | Image clarity | | (%) | 70 | 60 | 65 | 45 | 80 | 80 |
|  |  | | (Results) | 3 | 3 | 3 | 2 | 2 | 3 |
|  | Burr formation rate (%) | | (%) | 20 | 4.0 | 3.5 | 3.5 | 2.0 | 3.8 |
|  |  | | (Results) | 3 | 3 | 3 | 3 | 3 | 3 |
| Evaluation Results | Antistatic properties (surface resistance value) | | (Ω/sq.) | $4.2 \times 10^8$ | $4.3 \times 10^8$ | $3.0 \times 10^8$ | $2.0 \times 10^8$ | $4.3 \times 10^8$ | $40 \times 10^8$ |
|  |  | | (Results) | 3 | 3 | 1 | 1 | 3 | 3 |
|  |  | | (MPa) | 2200 | 000 | 1500 | 1500 | 1600 | 700 |
|  | Tensile modulus | | (Results) | 1 | 1 | 3 | 3 | 3 | 1 |
|  |  | | (Times) | 1 | >1000 | 200 | 8 | 8 | >1000 |
|  | Folding endurance | | (Results) | 1 | 3 | 3 | 1 | 1 | 3 |
|  |  | | | 22 | 25 | 8 | 18 | 8 | 23 |
|  | Moldability | | (Results) | 1 | 1 | 3 | 2 | 3 | 1 |

|  |  |  |  |  | Comparative Example | Refence Example | | |
|---|---|---|---|---|---|---|---|---|
|  |  |  |  |  | 8 | 1 | 2 | 3 |
| Surface Layer | Component (A) | (A-1) | (mass %) |  |  |  |  |  |
|  |  | (A-2) | (mass %) |  |  | 100 |  |  |
|  | Component (A') | (A'-1) | (mass %) | 80 |  |  |  |  |
|  |  | (A'-2) | (mass %) |  | 80 |  |  |  |
|  | Component (B) | (B-1) | (mass %) | 20 | 20 |  |  |  |
| Substrate Layer | Vinyl aromatic Hydrocarbon- based resin composition | (C-1) | (mass %) |  |  |  |  |  |
|  |  | (C-2) | (mass %) |  |  |  |  |  |
|  |  | (C-3) | (mass %) | 50 | 50 | 100 |  | 50 |
|  |  | (C-4) | (mass %) |  |  |  |  |  |
|  |  | (C-5) | (mass %) |  |  |  |  |  |
|  |  | (D-1) | (mass %) | 50 | 50 |  |  | 50 |
|  |  | (D-2) | (mass %) |  |  |  |  |  |
|  |  | Recycled material | (mass %) |  |  |  |  |  |
|  | Monomer units derived from conjugated dienes | | (mass %) | 10 | 10 | 20 | 0 | 10 |
| Structure | Thickness ratio (surface layers/ substrate layer) | | (—) | 20/80 | 20/80 | 20/80 | 20/80 | 20/80 |
|  | Image clarity | | (%) | 80 | 80 | 80 | 90 | 80 |
|  |  | | (Results) | 3 | 3 | 3 | 3 | 3 |
|  | Burr formation rate (%) | | (%) | 3.0 | 5.5 | 4.5 | 6.0 | 3.0 |
|  |  | | (Results) | 3 | 2 | 3 | 2 | 3 |
| Evaluation Results | Antistatic properties (surface resistance value) | | (Ω/sq.) | $4.1 \times 10^8$ | $4.4 \times 10^8$ | — | — | — |
|  |  | | (Results) | 3 | 3 | 1 | 1 | 1 |
|  |  | | (MPa) | 1700 | 900 | 700 | 1800 | 1400 |
|  | Tensile modulus | | (Results) | 3 | 1 | 1 | 3 | 3 |
|  |  | | (Times) | 8 | 700 | >1000 | 20 | 220 |
|  | Folding endurance | | (Results) | 1 | 3 | 3 | 2 | 3 |
|  |  | | | 11 | 11 | 30 | 15 | 8 |
|  | Moldability | | (Results) | 2 | 2 | 1 | 2 | 3 |

As indicated in Table 2, the layered sheets of the respective examples had an excellent balance of physical properties such as folding endurance, antistatic properties, and moldability, and had low burr formation rates. In contrast therewith, the layered sheets of the comparative examples not satisfying the features of the layered sheet of the present invention had inferior physical properties in terms of any one of folding endurance, antistatic properties, moldability, or burr formation rate, and a layered sheet satisfying all of these physical properties was not obtained. Due to the above results, it was confirmed that the layered sheet of the present invention has an excellent balance of physical properties such as folding endurance, antistatic properties, and moldability, and can suppress burr formation.

REFERENCE SIGNS LIST

10 Layered sheet
1 Substrate layer
2 Surface layer

The invention claimed is:
1. A layered sheet having a substrate layer and surface layers provided on both surfaces of the substrate layer, wherein:
the surface layers contain 50 to 90 mass % of component (A) defined below and 10 to 50 mass % of component (B) defined below relative to the overall mass of the surface layer;
the substrate layer is composed of a vinyl aromatic hydrocarbon-based resin composition containing monomer units derived from conjugated dienes; and
a percentage of the monomer units derived from the conjugated dienes in the substrate layer is 6 to 14 mass % relative to all monomer units in the vinyl aromatic hydrocarbon-based resin composition;
the vinyl aromatic hydrocarbon-based resin composition contains 30 to 70 mass % of component (C) defined below, 30 to 70 mass % of component (D) defined below, and 0 to 40 mass % of recycled layered sheet material relative to the overall mass of the vinyl aromatic hydrocarbon-based resin composition;

component (A) being a rubber-modified (meth)acrylic acid ester-vinyl aromatic hydrocarbon copolymer in which a percentage of a conjugated diene rubber component is 5 to 25 mass %;

component (B) being a polymeric antistatic agent, component (C) being a vinyl aromatic hydrocarbon-conjugated diene block copolymer; and component (D) being at least one polymer selected from the group consisting of vinyl aromatic hydrocarbon polymers and rubber-modified vinyl aromatic hydrocarbon polymers.

2. The layered sheet according to claim 1, wherein the polymeric antistatic agent is a block copolymer having, in a molecular chain, a hydrophilic block and at least one block selected from the group consisting of polyolefin-based blocks and polyamide-based blocks.

3. The layered sheet according to claim 1, wherein the thickness ratio between the layers in the layered sheet, represented by surface layer/substrate layer, is 10/90 to 50/50.

4. The layered sheet according to claim 1, wherein the layered sheet has an image clarity, as measured by a measurement method in accordance with the JIS-K-7374 standard, of 40% or higher.

5. The layered sheet according to claim 1, wherein the layered sheet has a tensile modulus, as measured by a measurement method in accordance with the JIS-K-7127 standard, of 1200 to 2000 MPa.

6. The layered sheet according to claim 1, wherein the layered sheet has a folding endurance, as measured by a measurement method in accordance with the JIS-P-8115 standard, of 30 times or more.

7. The layered sheet according to claim 1, wherein a punching burr formation rate is less than 10%.

8. An electronic component packaging container using the layered sheet according to claim 1.

9. The electronic component packaging container according to claim 8, wherein the electronic component packaging container is a carrier tape.

10. The electronic component packaging container according to claim 9, wherein the electronic component packaging container is a tray.

11. An electronic component packaging using the electronic component packaging container according to claim 8.

* * * * *